C. F. ROTH & E. G. BARKER.
Rotary Engine.
No. 167,692.
Patented Sept. 14, 1875.
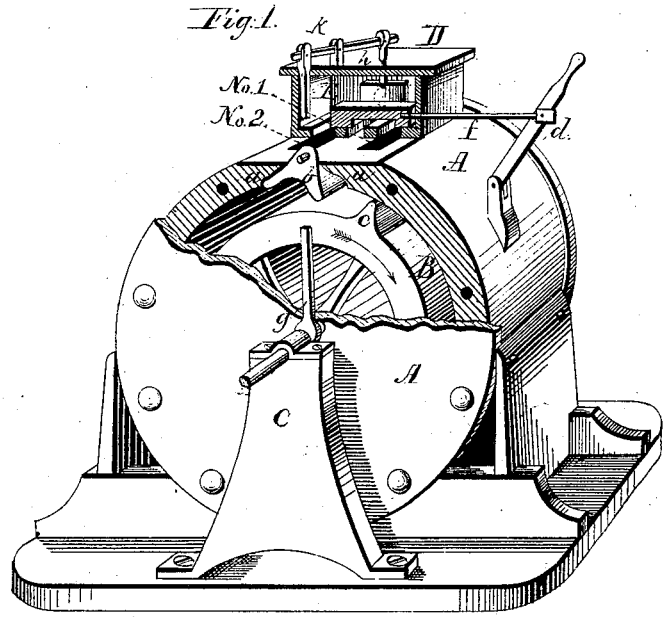
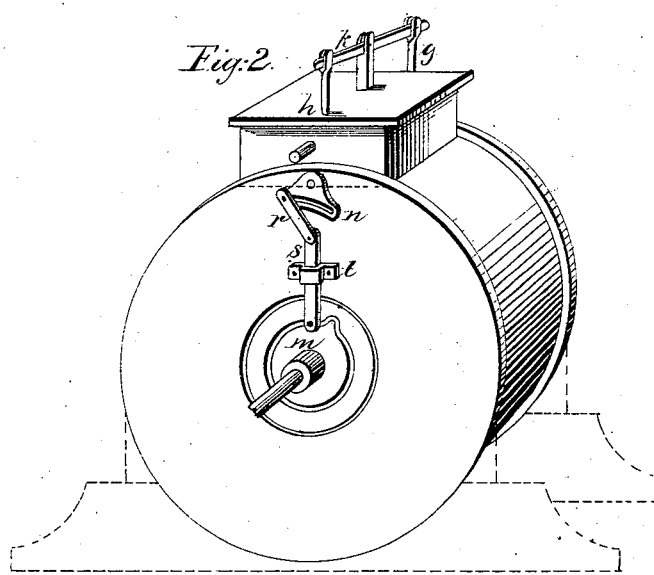

UNITED STATES PATENT OFFICE.

CHARLES F. ROTH AND ELIHU G. BARKER, OF WINTERSET, IOWA.

IMPROVEMENT IN ROTARY ENGINES.

Specification forming part of Letters Patent No. 167,692, dated September 14, 1875; application filed March 22, 1875.

*To all whom it may concern:*

Be it known that we, CHARLES F. ROTH and ELIHU G. BARKER, of Winterset, in the county of Madison and State of Iowa, have invented a Reversible Rotary Engine, of which the following is a specification:

The object of our invention is to provide a simple, practical, and economical reversible rotary engine. It consists in mounting a cylinder, having but one rigid piston, in a concentric case, having one duplex valve, and co-operating the cylinder and duplex valve by means of cams and cranks, as hereinafter fully set forth.

Figure 1 is a perspective view illustrating the construction and operation of our engine. Fig. 2 is a view from the opposite side, showing the mechanism which combines and co-operates the cylinder and duplex valve.

A A represent a cylindrical case, mounted upon and rigidly secured to a suitable base. A level plane is formed on the top to receive a steam-chest. In this plane are two ports, Nos. 1 and 2, which can be used alternately for receiving and discharging steam. $a$ is a wide groove or recess extending transversely across the under side of the top or roof of the case A, and may be termed the valve-seat of our duplex valve. $b$ is our duplex oscillating valve, in the form of an inverted trough, suspended to the case A by suitable ears and bearings at its ends. B is the revolving cylinder. Its axle, rigid therewith, extends through the center of the ends of the case A, and rests and revolves upon suitable bearing supported by the uprights C. $c$ is a piston extending across the surface of the cylinder B, and is cast solid therewith, or rigidly secured thereto, in any suitable manner. Suitable packing in the ends of the cylinder B, piston $c$, and valve $b$ is constantly in contact with the bearing-surfaces. Springs or elastic cushions may be under the packing to provide sufficient pressure, and to compensate for wear. D is a steam-chest. E is a reversible sliding valve, covering the ports in the case A. $d$ is a handle pivoted to the case A, and connected by means of the rod $f$ with the valve E. $g$ is a pitman connected with the axle of the cylinder B by a suitable eccentric or crank to operate a cut-off. $h$ is a cut-off valve, which prevents the steam from entering the steam-chest D whenever desired. $k$ is a tilting lever mounted upon the chest D, and connects the cut-off valve $h$ and its pitman $g$. $m$ is a disk, rigid on the axle of the cylinder B, and on the outside of the end of the case A. It has a suitably-shaped cam-groove to perform the functions of a crank in operating the duplex valve $b$. $n$ is a slotted yoke rigidly secured to the projecting shaft or end of the valve $b$ to perform the functions of a crank in oscillating or rocking the valve $b$ in its seat $a$. $r\ s$ is a jointed pitman, supported by a suitable bearing, $t$, on the case A, that connects the crank devices $m$ and $n$, and thereby the cylinder B and duplex valve $b$. A stud at the bottom works in the groove of the disk $m$, and a pin pivots its top to the slotted yoke $n$.

In the practical operation of our engine, the steam admitted into the chest D passes through port No. 1 into the annular chamber formed between the cylinder B and its concentric case A, and presses upon the piston $c$ to rotate the cylinder. The duplex valve $b$ at the same time divides the annular chamber into two compartments, one of which is receiving steam and the other discharging. The ports Nos. 1 and 2 extend in the case A beyond the reach of the valve $b$, and are at all times open for the free admission and discharge of the steam.

The sliding valve may be so adjusted that the inlet-port may be smaller and partly closed, while the outlet-port is larger and entirely open, so that the steam can escape more freely than it enters, and thereby prevent any back action and resistance.

When the piston $c$ approaches the valve $b$ the pitman $g$ rises and operates the cut-off valve $h$ simultaneously with the passage of the piston under the valve, and thereby checks and prevents the pressure of the steam from interfering with the operation of the valve. The cam-grooved disk $m$, moving around the stud on the lower end of the jointed pitman $r\ s$, raises and lowers and lengthens and shortens the pitman, and rocks the yoke or crank $n$, and thereby vibrates or turns the duplex valve $b$ at the precise point of time required to allow the piston $c$ to pass under it.

To reverse the motion, move the valve E, by means of the lever $d$, to alternate the inlet and outlet ports Nos. 1 and 2, and connect the pitman $r$ with the opposite end of the slotted yoke or crank $m$.

A simple rotary engine is thus produced that is practically operated with a single piston in such a manner as to secure all the advantages of steam expansion, and to avoid the increase of friction and complication resulting from the duplication of pistons.

We claim as our invention—

The cam-grooved disk $m$ on the axle of the cylinder B, in combination with the jointed pitman $r$ $s$, reversible crank $n$, and duplex oscillating valve $b$, substantially as and for the purposes shown and described.

CHARLES F. ROTH.
ELIHU G. BARKER.

Witnesses:
R. L. LEECH,
J. M. ANDREWS.